United States Patent

Abedi

(10) Patent No.: US 9,693,284 B2
(45) Date of Patent: Jun. 27, 2017

(54) SHORT-RANGE WIRELESS NETWORKS

(75) Inventor: Saied Abedi, Reading (GB)

(73) Assignee: FUJITSU LIMITED, Kawasaki (JP)

(*) Notice: Subject to any disclaimer, the term of this patent is extended or adjusted under 35 U.S.C. 154(b) by 1112 days.

(21) Appl. No.: 13/254,082

(22) PCT Filed: Feb. 9, 2010

(86) PCT No.: PCT/EP2010/051589
§ 371 (c)(1),
(2), (4) Date: Nov. 14, 2011

(87) PCT Pub. No.: WO2010/100011
PCT Pub. Date: Sep. 10, 2010

(65) Prior Publication Data
US 2012/0063389 A1 Mar. 15, 2012

(30) Foreign Application Priority Data

Mar. 4, 2009 (EP) .................................. 09154357

(51) Int. Cl.
H04W 4/00 (2009.01)
H04W 40/12 (2009.01)
H04L 12/703 (2013.01)
H04W 40/06 (2009.01)
H04W 40/08 (2009.01)
(Continued)

(52) U.S. Cl.
CPC ............ *H04W 40/12* (2013.01); *H04L 45/28* (2013.01); *H04B 7/15528* (2013.01); *H04W 40/06* (2013.01); *H04W 40/08* (2013.01); *H04W 40/18* (2013.01)

(58) Field of Classification Search
CPC ........ H04L 45/28; H04W 40/12; H04W 20/18

USPC ......................................................... 370/328
See application file for complete search history.

(56) References Cited

U.S. PATENT DOCUMENTS

2005/0195740 A1* 9/2005 Kwon ........................... 370/229
2005/0268153 A1* 12/2005 Armstrong .......... G06F 11/0709
714/4.1
2006/0098608 A1* 5/2006 Joshi ............................ 370/338
(Continued)

FOREIGN PATENT DOCUMENTS

EP 1 050 977 11/2000
EP 1050977 11/2000
(Continued)

OTHER PUBLICATIONS

Taiwanese Office Action dated Apr. 29, 2013 in corresponding Taiwanese Application No. 099102815.
(Continued)

*Primary Examiner* — Derrick Ferris
*Assistant Examiner* — Farhad Ali
(74) *Attorney, Agent, or Firm* — Staas & Halsey LLP

(57) ABSTRACT

A wireless network of devices comprising a relay start device, an intermediate device and a relay end device, information being communicated wirelessly in use between the relay start device and the relay end device via the intermediate device, wherein:
the intermediate device comprises control means and transmission means, the control means being operable to cause the intermediate device transmission means to transmit an indication of connection stability as a function of at least one connection stability parameter of the intermediate device.

13 Claims, 18 Drawing Sheets

(51) Int. Cl.
*H04W 40/18* (2009.01)
*H04B 7/155* (2006.01)

(56) References Cited

U.S. PATENT DOCUMENTS

| | | | |
|---|---|---|---|
| 2006/0160555 | A1 | 7/2006 | Kobayashi et al. |
| 2007/0153737 | A1* | 7/2007 | Singh et al. .................. 370/331 |
| 2008/0092638 | A1 | 4/2008 | Brenneman et al. |
| 2008/0108300 | A1 | 5/2008 | Teng et al. |
| 2009/0063187 | A1* | 3/2009 | Johnson et al. .................. 705/2 |

FOREIGN PATENT DOCUMENTS

| | | | |
|---|---|---|---|
| JP | 2006-180139 | 7/2006 | |
| JP | 2007-243794 | 9/2007 | |
| JP | 2008-519531 | 6/2008 | |
| JP | 2008-193165 | 8/2008 | |
| JP | 2008-301268 | 12/2008 | |
| TW | 200822628 | 5/2008 | |
| TW | 200834071 | 8/2008 | |
| WO | 2005/010214 | 2/2005 | |
| WO | WO 2005010214 A2 * | 2/2005 | ............ H04W 84/18 |
| WO | WO 2006/052715 A2 | 5/2006 | |

OTHER PUBLICATIONS

Japanese Office Action mailed Jul. 16, 2013 in corresponding Japanese Application No. 2011-552375.
Taichi Yuki et al., "A study on Performance Improvement of TCP Over an Ad Hoc Network", Institute of Electronics, Information and Communication Engineers, vol. J85-B, No. 12, Dec. 2002, pp. 2045-2053.
Thafer H. Sulaiman, et al, Improved PNC Selection Criteria and Process for IEEE 802.15.3, IEEE Communications Magazine, Dec. 2007, pp. 102-109.
IEEE 802.15.4-2006 Standard, Sep. 8, 2003.
IEEE 802.15.3-2003 Standard, Sep. 29, 2003.
IEEE 802.15.6 Standard, Jun. 2011.
European Search Report issued Aug. 21, 2009 in European Application No. 09154357.9-1249.
International Search Report issued Jun. 11, 2010 in PCT/EP2010/051589.
Korean Notice of Preliminary Rejection dated Feb. 1, 2013, issued in corresponding Korean Patent Application No. 10-2011-7023339.

* cited by examiner

| Bits: 0-2 | 3 | 4 | 5 | 6 | 7-9 | 10-11 | 12-13 | 14-15 |
|---|---|---|---|---|---|---|---|---|
| Frame Type | Security Enabled | Frame Pending | Ack. Request | PAN ID Compression | Reserved | Dest. Addressing Mode | Frame Version | Source Addressing Mode |

| Frame type value b2 b1 b0 | Description |
|---|---|
| 000 | Beacon |
| 001 | Data |
| 010 | Acknowledgment |
| 011 | MAC command |
| 100-111 | Reserved |

| Bits: 0-2 | 3 | 4-5 | 6 | 7 | 8 | 9-10 | 11-12 | 13-14 | 15-16 | 17 | 18 |
|---|---|---|---|---|---|---|---|---|---|---|---|
| Frame Type | Security Enabled | Reserved | Frame Pending /More Data | Ack Policy | PAN ID Comparison | Dest. Addressing Mode | Frame Vision | Source Addressing Mode | Reserved | Stability | Force Sleep |
|  |  |  |  |  |  |  |  |  |  | 71 | 72 |

| Octets | 1 | 1 | (see 7.2.2.4.1) | 0/5/6/10/14 | 1 | Variable | 2 |
|---|---|---|---|---|---|---|---|
| Frame control | Sequence Number | | Addressing fields | Auxiliary Security Header | Command Frame Identifier | Command Payload | FCS |
| MHR | | | | | | MAC Payload | MFR |

FIG. 19

| Command frame identifier | Command name | RFD Tx | RFD Rx | Subclause |
|---|---|---|---|---|
| 0x01 | Association request | X | | 7.3.1 |
| 0x02 | Association response | | X | 7.3.2 |
| 0x03 | Disassociation notification | X | X | 7.3.3 |
| 0x04 | Data request | X | | 7.3.4 |
| 0x05 | PAN ID conflict notification | X | | 7.3.5 |
| 0x06 | Orphan notification | X | | 7.3.6 |
| 0x07 | Beacon request | | | 7.3.7 |
| 0x08 | Coordinator realignment | | X | 7.3.8 |
| 0x09 | GTS request | | | 7.3.9 |
| 0x0a-0xff | Reserved | | | - |

FIG. 20

| Octets | 1 | 0 |
|---|---|---|
| MHR Fields | Command Frame Identifier Stability (0x0c) | MAC Command Payload<br><br>Example No Payload |

FIG. 21

| Octets | 1 | 1 |
|---|---|---|
| MHR Fields | Command Frame Identifier Stability (0x0c) | MAC Command Payload<br><br>Example With Payload |

FIG. 21b

| Command frame identifier | Command name | RFD Tx | RFD Rx |
|---|---|---|---|
| 0x01 | Association request | X | |
| 0x02 | Association response | | X |
| 0x03 | Disassociation notification | X | X |
| 0x04 | Data request | X | |
| 0x05 | PAN ID confliction notification | X | |
| 0x06 | Orphan notification | X | |
| 0x07 | Beacon request | | |
| 0x08 | Coordinator realignment | | X |
| 0x09 | GTS request | | |
| 0x0a | Emergency notification | X | X |
| 0x0b | Handover | X | X |
| 0x0c | Stability | X | X |
| 0x0d-0xff | Reserved | | |

FIG. 22

SHORT-RANGE WIRELESS NETWORKS

CROSS REFERENCE TO RELATED APPLICATIONS

This application is a national phase application, under 35 U.S.C. 371, of international application No. PCT/EP2010/051589, filed on Feb. 9, 2010, which claimed priority to European Patent Application No. 09154357.9, filed on Mar. 4, 2009, the disclosures of which are incorporated herein by reference.

The present invention relates to wireless personal area networks and particularly, but not necessarily exclusively, to wireless sensor networks and to body area networks including wirelessly-communicating sensors disposed on or around a human or animal body.

The so-called Body Area Network or BAN is an example of wireless personal area networks (WPANs), used to convey information over relatively short distances.
Unlike wireless local area networks (WPANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of a patient. A BAN employing mainly sensors for feeding sensed data to a data sink (which may also be a network co-ordinator) is an example of a wireless sensor network (WSN); however, more active devices, such as actuators, may be also be included in a WSN acting as an MBAN.

Another interesting use of short-range wireless networks is in industrial monitoring. Such wireless networks may be designed to include sensors and/or other devices. For example, one deployment would include sensors arranged to measure a parameter such as temperature at various different positions on a turbine blade or other industrial part for monitoring. Again, more active devices can be included in such a wireless network and little or no infrastructure is required.

Standard IEEE 802.15.4 defines the physical layer (PHY) and medium access control (MAC) sublayer specifications for low data-rate WPANs, although the coverage of an IEEE 802.15.4 network may extend beyond a personal operating space (POS) which typically defines the WPAN and is thus also suitable for somewhat larger-scale industrial deployment. Such slightly larger-scale networks are included within the terms WSN, WPAN and BAN for the purposes of this application. IEEE 802.15.4 has some similarities with a standard for an ad-hoc piconet, IEEE 802.15.3. Such piconets around a person or object typically cover at least 10 m in all directions and envelop the person or object, whether stationary or in motion. They include higher data-rate WPANs. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs.

In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of sensors around a patient in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as 1 meter may be adequate. However, medical WSN applications are mission critical applications in the clinical environment. Robust wireless relays for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas. Efforts are therefore in progress to define a further standard IEEE802.15.6 which aims to define the properties of Body Area Networks, particularly for medical applications.

One of the key requirements of IEEE 802.15.3, IEEE 802.15.4, IEEE802.15.6 and other standards related to wireless networks is reliability. This is especially important for emergency situations in which the life of the patient depends on the reliability of wireless links in medical WSN applications, or for monitoring mission critical industrial environments, such power stations.

According to one aspect of the present invention there is provided a wireless network of devices comprising a relay start device, an intermediate device and a relay end device, information being communicated wirelessly in use between the relay start device and the relay end device via connection to the intermediate device, wherein the intermediate device comprises control means and transmission means, the control means being operable to cause the intermediate device transmission means to transmit an indication of connection stability as a function of at least one connection stability parameter of the intermediate device.

Intermediate devices (that is devices acting as a relay on a transmission route) in particular can undermine the reliability of a network connecting via the intermediate device if one or more of its connections become unstable due to low signal-to-noise ratio, depleted battery charge and other similar factors. In invention embodiments, an unstable intermediate device can be identified by the network using the stability parameter and thus any appropriate action can be taken, for example to allow it to be effectively switched off, when the parameter reveals instability of the device, thus allowing the network to work around the unstable device and protect the transmission of patient information or other mission critical information.

By using a stability parameter, which reveals changes occurring in the early stages of transmission difficulties, when connection faults may be intermittent and transmission is still successful, action can be taken before the connection is lost, or at least very shortly thereafter, potentially giving a dramatic increase in network reliability over any methods which simply recover permanently lost connections via a different route.

The transmission of the indication of stability may be in the downlink direction or in the uplink direction. Preferably, the indication is transmitted to the relay start device. This may be in the uplink direction (directly or indirectly to a network coordinator, which may then produce the stop command as set out below in dependence upon the indication and its origin) or in the downlink direction (so that any transmission of the indication or of any signalling derived from the indication and its origin should then preferably be sent via another transmission route to the coordinator to avoid the unstable intermediate device). The skilled reader will also appreciate that the transmission direction between the relay start device and relay end device is either uplink or downlink.

Preferably, the network comprises decision means operable on receipt of the indication of stability to take it into account to decide whether to transmit a stop/sleep command to the intermediate device, causing it to stop transmission and reception by a simple switch off or by going into 100% (full) sleep mode.

The stop command may force the intermediate device into a full sleep mode, at least temporarily, for example until steps have been taken to remedy the situation causing the loss of stability. In particular battery-powered devices usually require duty cycling to reduce power consumption. Duty-cycling devices have a sleep pattern, spending much of their operational life in a sleep state. Such devices "wake up" periodically to transmit or receive. The Sleep/wake up pattern (also referred to simply as sleep pattern) is periodic and determines the length of time for which a device is awake for transmission and reception during each period of time. It may be sent to the device in the form of sleep pattern bits. A device in full sleep mode does not wake up for transmission and reception. The full sleep mode may, of course, also be applied to non-battery powered devices, in order to stop their transmission and reception. An advantage of putting the device in 100% sleep is that the instability may be due to a temporary obstacle reducing the quality of the radio channel. The network may come back to the device and check it again. If transmission and reception is simply switched off, this may not be possible in some circumstances. In one embodiment the device includes an internal timer, and/or a suitable threshold for wakeup so that the sleeping unstable device (or device with RX/TX switched off) wakes up and sends a request for transmission periodically, say for example every five 5 hours. If the instability is no longer apparent, the device can join the network.

The terms "relay start" and "relay end" are used herein to denote a function of a wireless device in respect to the information transmission route via the intermediate device, in that information is transmitted directly between each of the relay start device and the relay end device and the intermediate device. The relay start device and relay end device may each form the end of an information transmission route (such as the coordinator of the wireless network, or an actuator or sensor or other end device) or they may themselves be a relay on the information transmission route. In more complex networks, any or all of the devices mentioned can have dual or multiple functions, acting for example as a sensor and as a relay, or as a coordinator and a relay.

The indication of stability can be transmitted in any suitable fashion, possibly within a data frame. The indication may in fact comprise the actual stability parameter value(s), or the parameter value(s) may be processed in some way by an intermediate device processing means to produce the indication. For example, the indication may be calculated based on the comparison of the parameter to a lower or upper threshold, or derived from a change or rate of change. The indication may be further processed to put it into a form suitable for transmission, for instance using a look-up table, which may equate one or more threshold comparison results with bits for transmission.

Preferably, when the network uses transmission frames, the indication is transmitted in a transmission frame, for example in a control field or in the payload. This may be by using a control field set to a predetermined value or as a payload in a MAC command frame. In one preferred embodiment, the value can be one or more bits acting in combination to indicate stability.

If one bit is used, the stability indication is either on or off. In more complex realisations, more than one level of stability/instability may be provided by use of the indication of stability, so that the network can react in a differentiated way to a probable lack of stability and a more certain lack of stability in the intermediate device. For example, two bits can be used to denote states such as stable, stability concern, instability and stability emergency.

In preferred embodiments, transmission of the indication takes priority over other transmissions from the intermediate device. For example, transmissions including the indication can be scheduled before transmissions not including the indication. Alternatively, the indication can be sent in all transmission frames sent from the intermediate device permanently, or over a particular time period.

Any suitable parameter demonstrating intermittent incomplete functioning in device transmission and/or reception so that connection to the network is intermittent can be used as an intermediate device stability parameter.

The network preferably includes acknowledgement functionality, so that transmission of information is acknowledged. In this case, one stability parameter may be the accumulated number of missed acknowledgements of transmission expected, but not received by the intermediate device.

Often, the intermediate device further comprises a transmission buffer holding information waiting for transmission and if so, one stability parameter can be the amount of information waiting in the transmission buffer. Particularly if there is a smaller transmission buffer, one stability parameter used in addition to or as an alternative to the amount of information waiting may be the number of data packets dropped by the intermediate device.

The skilled reader will appreciate that in both the above examples, the parameter(s) chosen may be inversely proportional to connection stability and thus may more conventionally be viewed as instability parameters, but other parameters may be directly proportioned to stability.

Any stability parameters may be combined for a more certain demonstration of stability. Equally, one parameter beyond its threshold taken alone can give a higher level indication of stability/instability than a combination of parameters each beyond its respective threshold. In one preferred embodiment, an indication of low stability is sent if both the accumulated number of missed acknowledgements and the information waiting/data packets dropped parameters pass a predetermined threshold for that parameter. For example, once the threshold for missed acknowledgements has been crossed, the intermediate device control means check to see if the threshold for the information waiting/data packets dropped parameters has been crossed, and if so, the indication of low stability/instability is sent.

The decision means provided in the network to decide whether to send the stop/sleep command can operate based on the indication of stability alone, regardless of whether one or more levels of stability are provided. Alternatively, it may take other factors into account, for example the availability of an alternative route avoiding the intermediate device and/or the emergency status of ongoing transmission.

It is of course important to establish a new reliable route once it has been ascertained that an intermediate device is unstable, if at all possible. Preferably, the wireless network of devices further comprises reconnection means operable to establish an alternative route avoiding the intermediate device. The reconnection means may be caused to operate by the relay start device control means, or by a coordinator of the network, depending on the distribution of the network control structure.

Control means in the relay start device may be operable to increase that device's transmission power for the reconnection. The alternative route may be established simply using such an increase in transmission power in an attempt to reach other intermediate devices, for example by "leapfrogging" the original intermediate device. Alternatively, or additionally, the control means of the relay start device may instruct use of a new geographical transmission pattern diverting from the intermediate device. This latter strategy is for use with directional antennae.

Preferably, the reconnection means themselves include the control means in the relay start device and control means in a further device replacing the intermediate device on the route, which are together operable to set up a new connection.

In preferred embodiments, the reconnection means are operable (after the indication of stability and) before the stop command is issued, to give network continuity. That is preferably the stop command only issues if the connection means have been successful in establishing an alternative transmission route.

The decision means requires sufficient processing power to react suitably to the indication of stability, perhaps in combination with other factors relating to the information transmission route in question or to other network issues. In a more distributed scenario, they may be provided in the relay start device. However preferably, the decision means are provided in the network coordinator. In such cases, the relay start device may be operable to transmit the intermediate device identification to the coordinator (preferably along with the relevant indication of stability). Subsequently, the stop command is preferably transmitted from the coordinator to the relay start device and on to the intermediate device.

The wireless network of devices may further comprise alarm means operable to alert an outside entity to instability of the intermediate device in dependence upon the indication of stability. Thus even under circumstances in which the stop command is not sent (for example if there is no alternative route, or if the level of instability is not yet sufficiently high to justify cutting the device out of the network), an external warning can be provided.

For example, the coordinator can send an alarm to a central monitoring unit, which is in wired or wireless connection with the coordinator. Thus, the central monitoring unit can be part of the wireless sensor network or not, depending on the WSN deployment.

A central monitoring unit (also sometimes referred to as a central monitoring and medical care unit, in medical applications) can be a station with monitoring equipment capable of receiving continuous or occasional streams of emergency data from multiple stations (for example for multiple patients or multiple machines). The central monitoring unit may include operatives (such as nurses or medical specialists) whose role is to monitor the data received. These operatives can take action in response to changes in conditions, for example, in individual patients or industrial parts.

In a further aspect, invention embodiments provide a device for use in a wireless network of devices, information being communicated wirelessly in use between the device and at least one other network device, the device comprising: transmission and reception means; and control means operable to control the device; wherein the control means are operable to cause the transmission means to transmit an indication of connection stability as a function of at least one connection stability parameter of the device.

Thus the stability indication is suitable for use with any network device, providing a useful indicator of its connection stability. Hence any reference to intermediate devices herein should be taken to apply more generally network devices, as appropriate.

In a further aspect, invention embodiments provide an intermediate device for use in a wireless network of devices comprising a relay start device, the intermediate device and a relay end device, information being communicated wirelessly in use between the relay start device and the relay end device via the intermediate device, the intermediate device comprising: transmission and reception means; and control means operable to control the device; wherein the control means are operable to cause the transmission means to transmit an indication of stability as a function of at least one stability parameter of the device and to stop transmission and/or reception of the device when a stop command is received as a result of the indication of stability.

As the skilled reader will appreciate from the foregoing, the reception means of the intermediate device is preferably operable to receive a command to force the intermediate device to stop operation (for example by forcing it into a full sleep mode) transmitted taking the indication of stability into account; and the control means are operable to stop device operation as a result of the command (forcing the intermediate device into the sleep mode).

In a further aspect, invention embodiments provide a coordinator in a wireless network of devices comprising at least the coordinator, an intermediate device and a relay end device, information being communicated wirelessly in use between the coordinator and the relay end device via the intermediate device, wherein the coordinator comprises: reception means operable to receive an indication of connection stability of the intermediate device from the intermediate device; and decision means operable on receipt of the indication of stability to take it into account to decide whether to transmit a stop command to the intermediate device, causing it to stop transmission and reception.

In this aspect, the coordinator may take the role of the relay start device and so communicate directly with the intermediate device. Alternatively, the coordinator may be further along the transmission route than the relay start device and receive from and transmit to the intermediate device indirectly, that is at least via the relay start device and potentially additionally via other devices.

In a yet further aspect of the present invention, embodiments provide a transmission frame format for use in a wireless network, wherein the transmission frame format includes a stability field for an indication of stability relating to connection stability of an intermediate device, and a stop field for use in commanding an intermediate device to stop transmission and reception. Preferably these two fields are provided as control fields or payload fields in a MAC frame.

According to a method aspect of the present invention there is provided a method in a wireless network of devices comprising a relay start device, an intermediate device and a relay end device, in which method information is communicated wirelessly between the relay start device and the relay end device via the intermediate device, wherein the intermediate device transmits an indication of connection stability as a function of at least one connection stability parameter of the intermediate device; and the network takes it into account to decide whether to transmit a stop command to the intermediate device, causing it to stop transmission and reception.

According to another method aspect, there is provided a method in an intermediate device of a wireless network of devices comprising a relay start device, the intermediate device and a relay end device, in which method information is communicated wirelessly between the relay start device and the relay end device via the intermediate device, wherein the intermediate device transmits an indication of connection stability as a function of at least one connection stability parameter of the device and stops reception and transmission if it receives a stop command from the network as a result of the indication.

According to a still further method aspect there is provided a method in a coordinator of a wireless network of devices comprising at least the coordinator, an intermediate device and a relay end device, in which method information is communicated wirelessly between the coordinator and the relay end device via the intermediate device, wherein the coordinator receives an indication of connection stability of the intermediate device from the intermediate device; and takes it into account to decide whether to transmit a stop command to the intermediate device, causing it to stop transmission and reception.

Further aspects of the present invention provide software (or a computer program) which, when executed by a processor of a sensor or a coordinator of a wireless sensor network or a control monitoring unit provides functionality of the above sensor or coordinator or control monitoring unit respectively and software (or a computer program) which, when executed by a sensor or coordinator, carries out the methods described for these devices. Such software may be stored on a computer-readable medium.

Many features are described above with respect to one aspect only, to avoid repetition. However, features and preferred features of any of these aspects are freely combinable and applicable to other aspects as appropriate. In particular, the reader will appreciate that where transmission and reception means are defined, corresponding reception and transmission means respectively are provided at the opposite end of the signal path. The skilled reader will also appreciate that the devices in the wireless network each comprise transmission means, reception means and control means, operable to carry out the method steps/functionality defined.

For a better understanding of the present invention, and to show more clearly how it may be carried into effect, reference will now be made, by way of example only, to the following drawings in which.

Figure 12A:
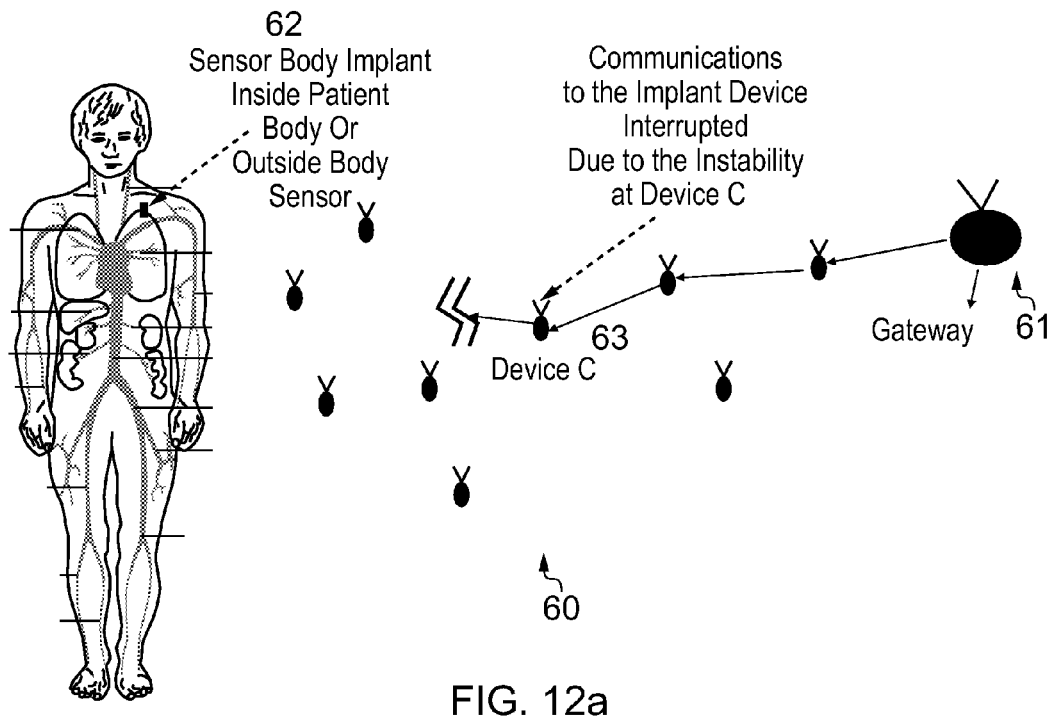
Figure 12B:
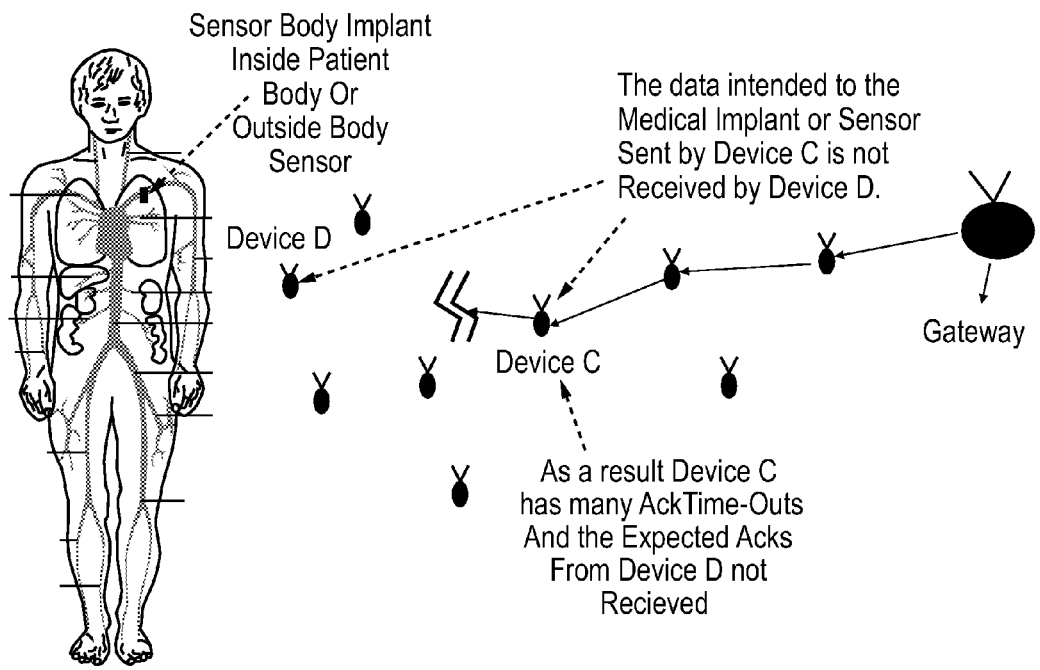
Figure 12C:
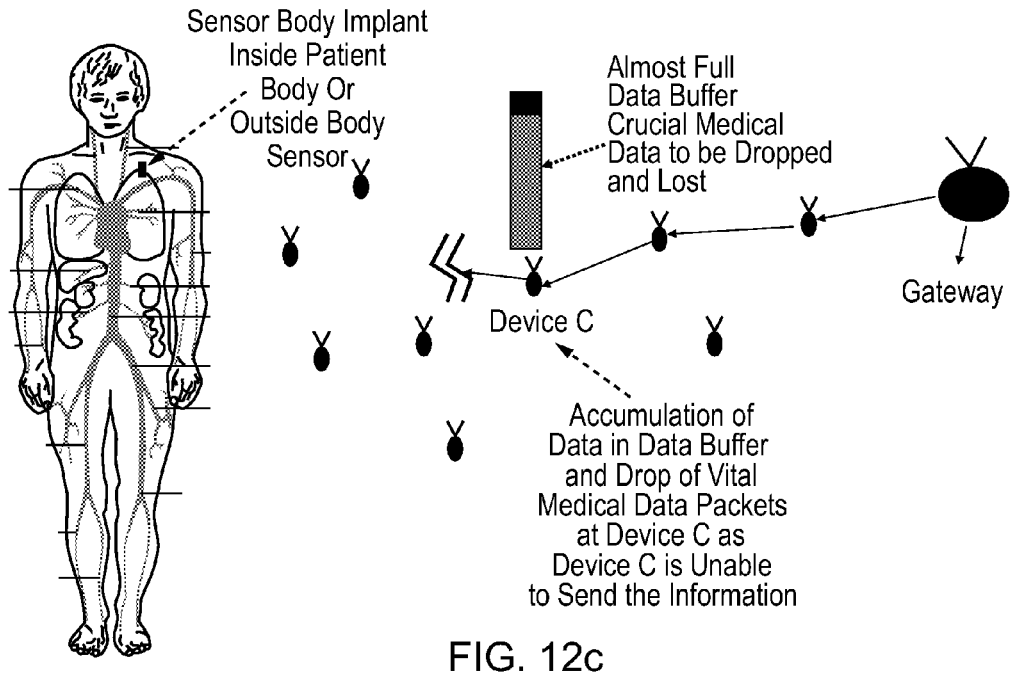
Figure 12D:
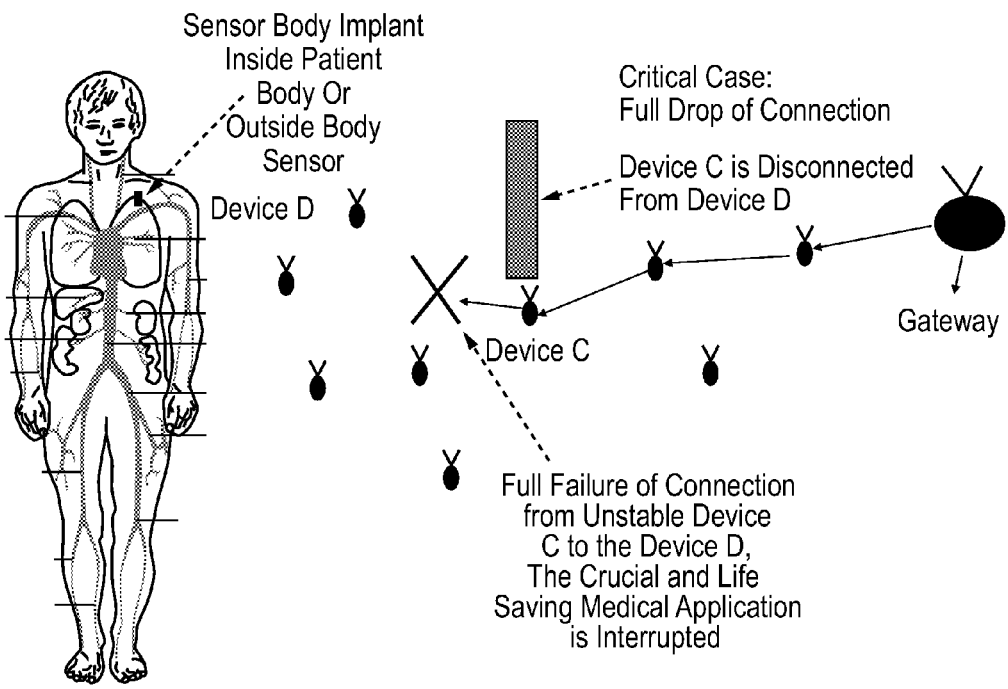
Figure 13:
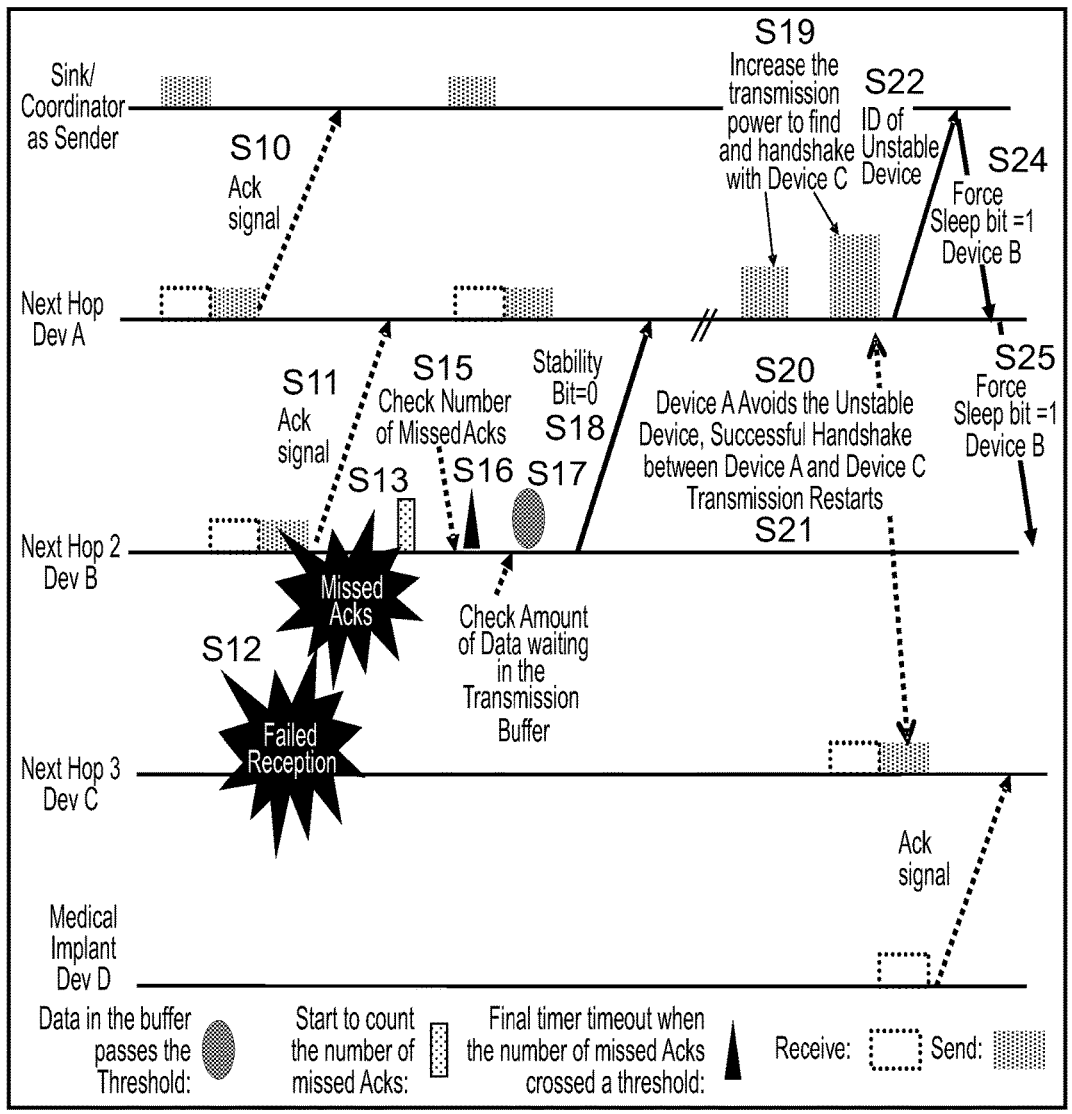
Figure 14:
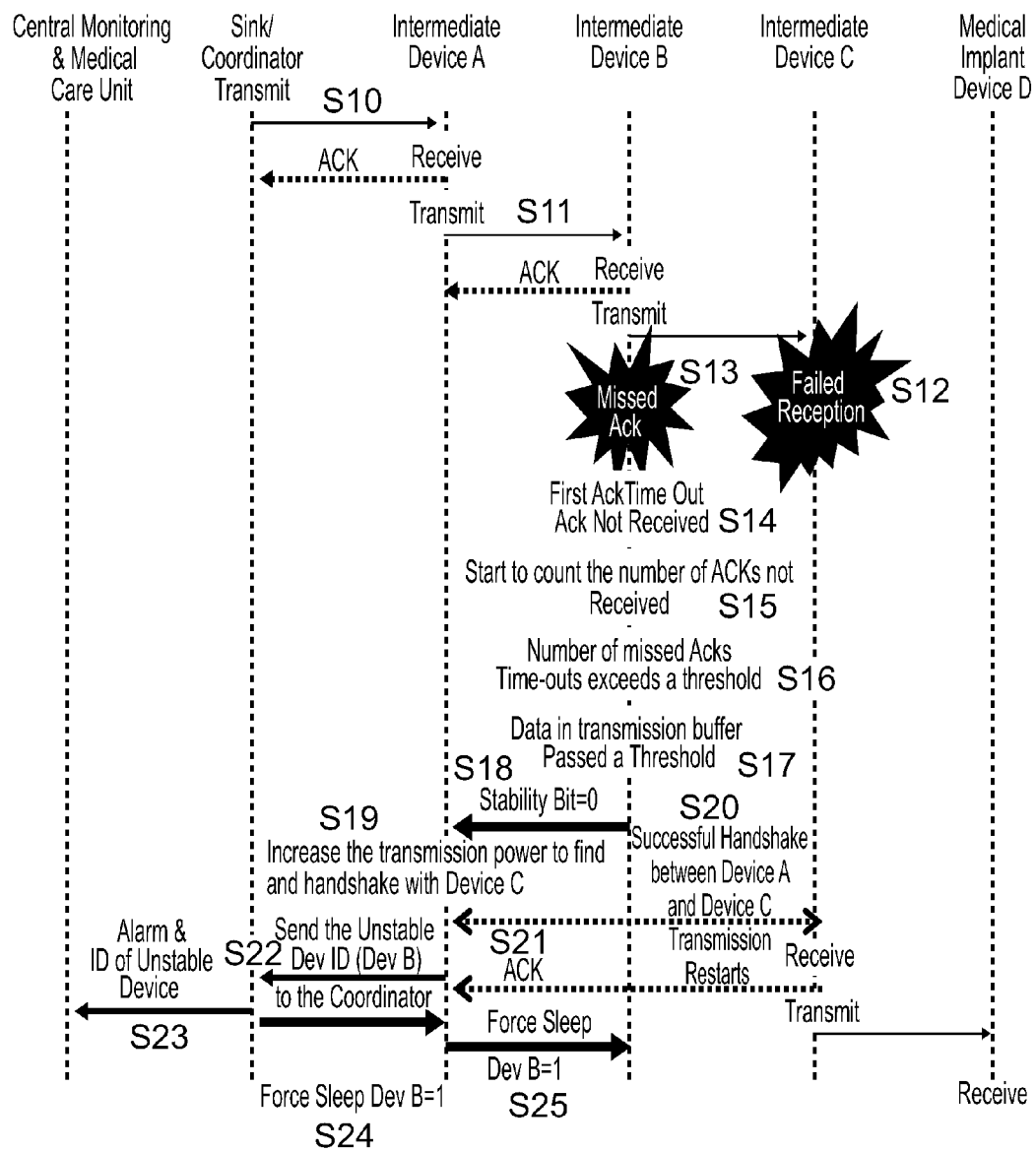
Figure 15A:
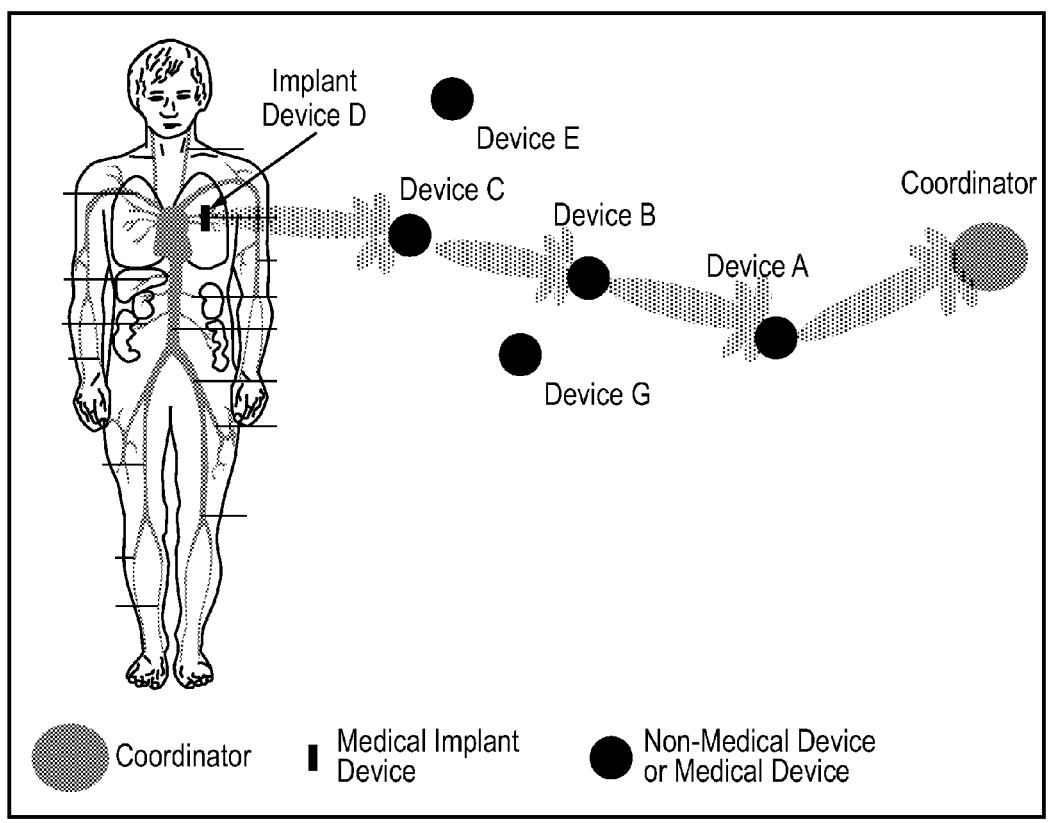
Figure 15B:
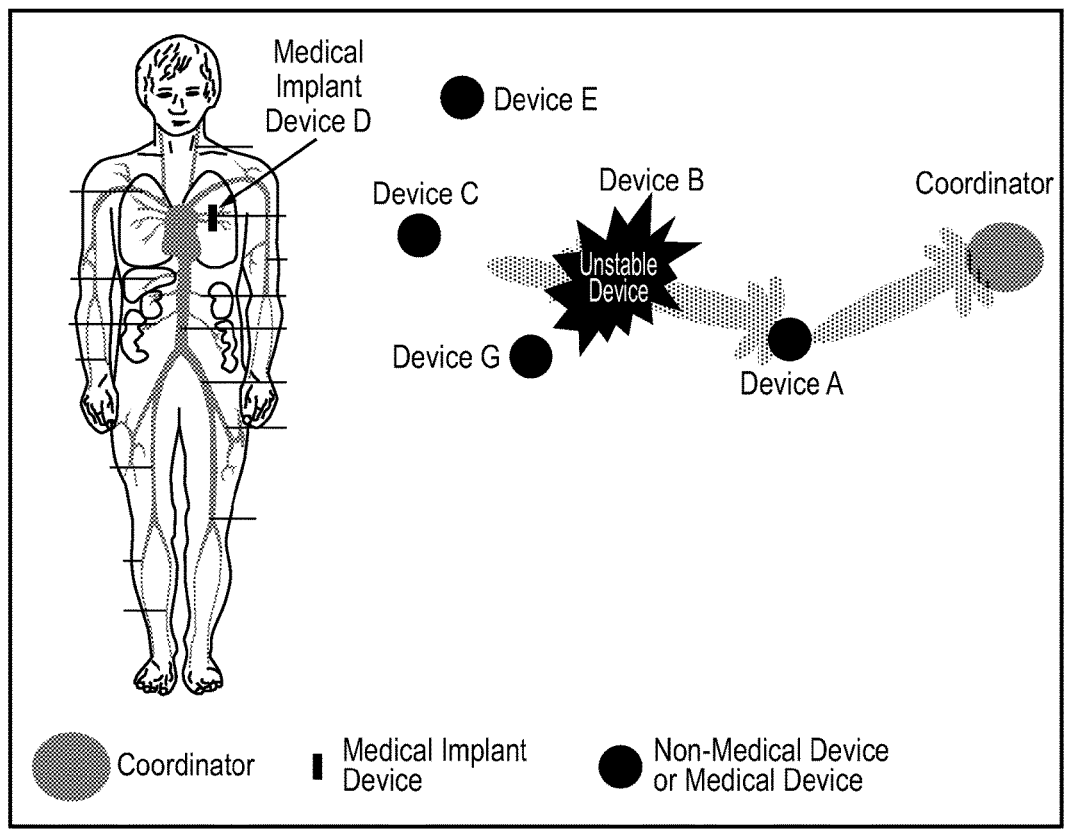
Figure 15C:
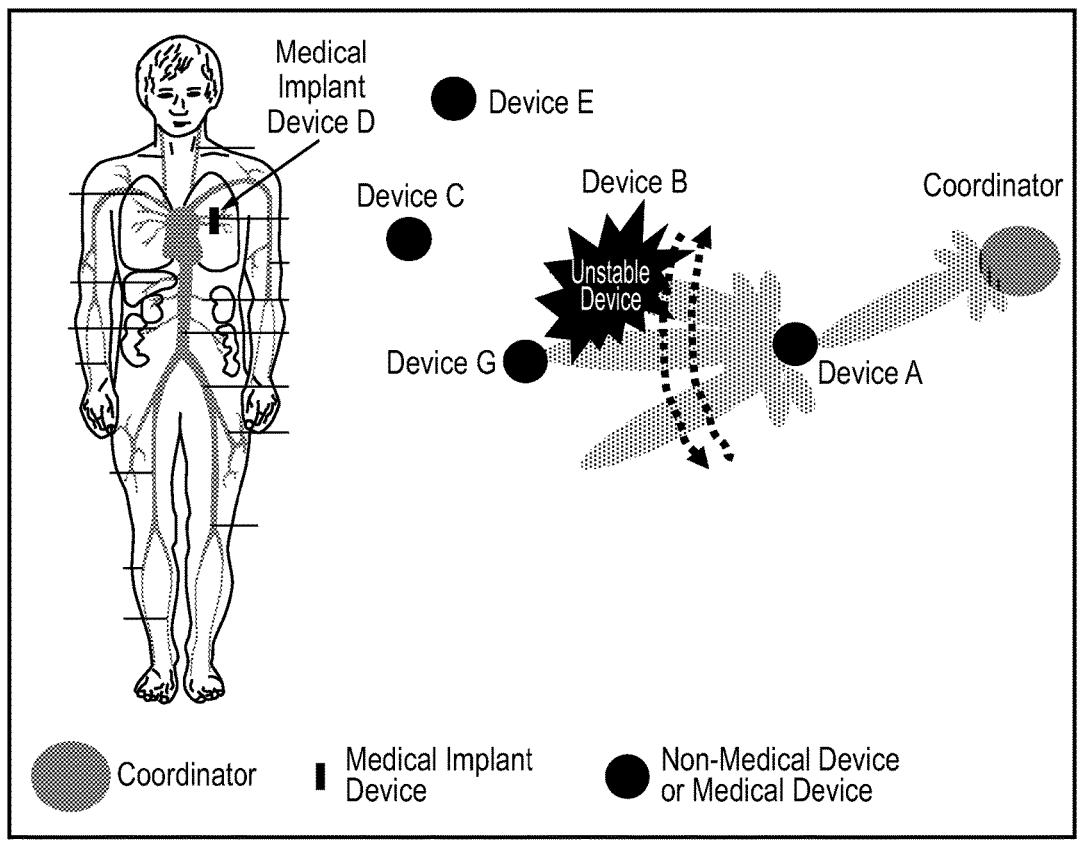
Figure 15D:
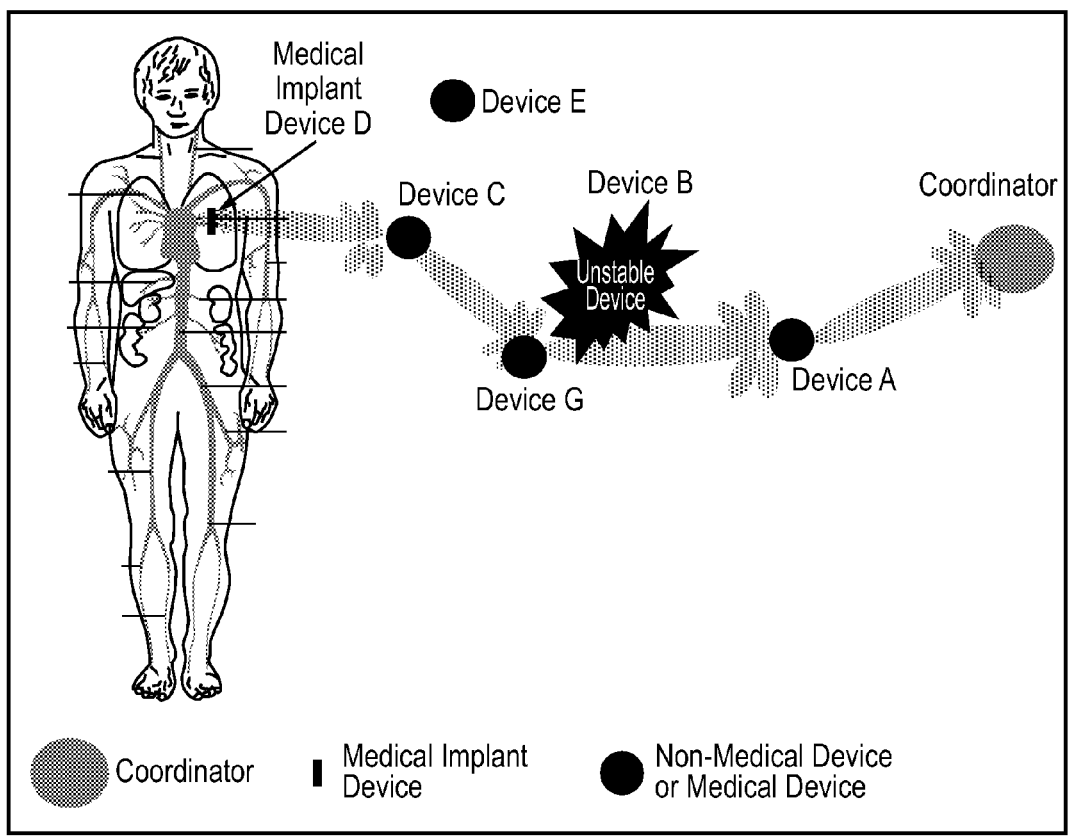
Figure 16:
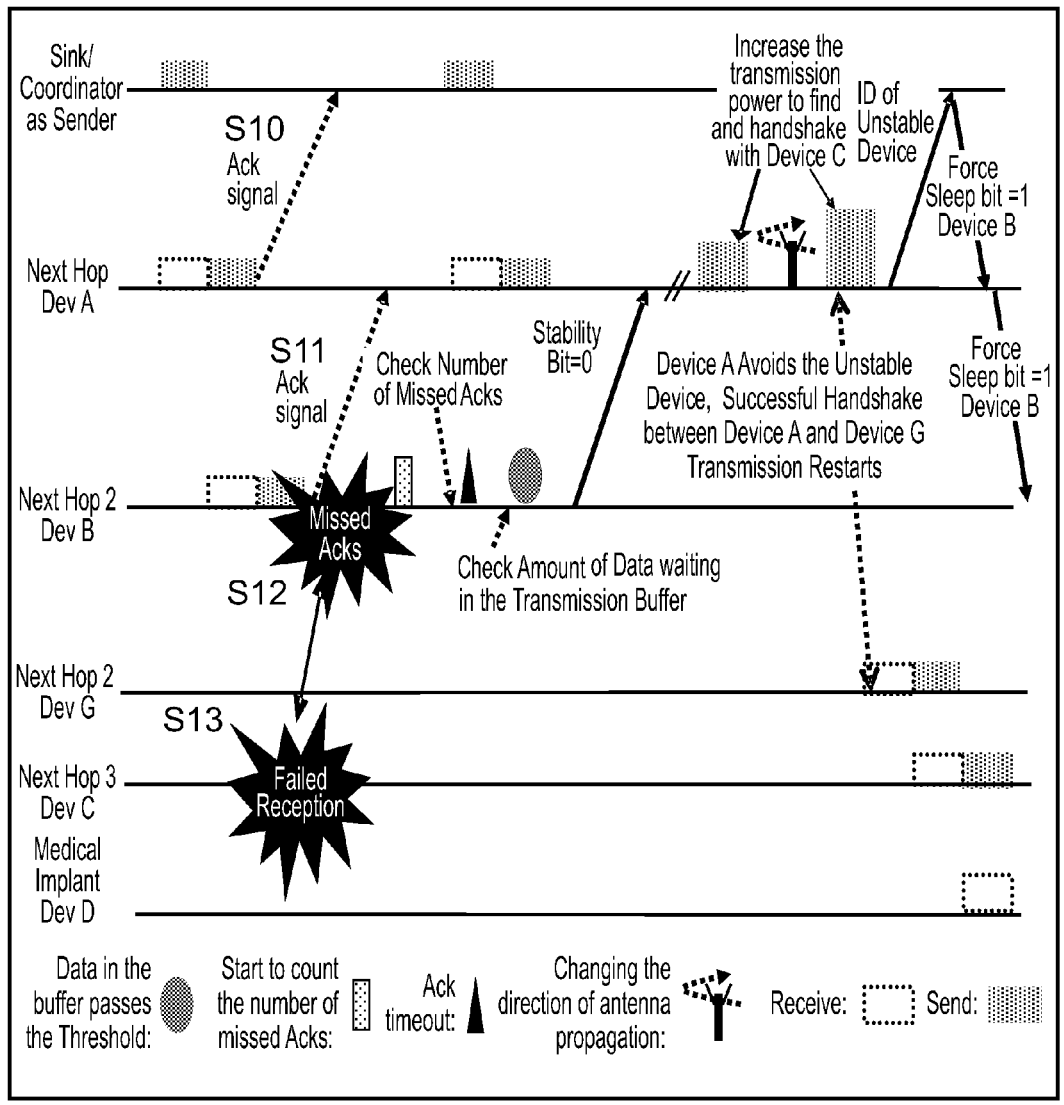
Figure 17:
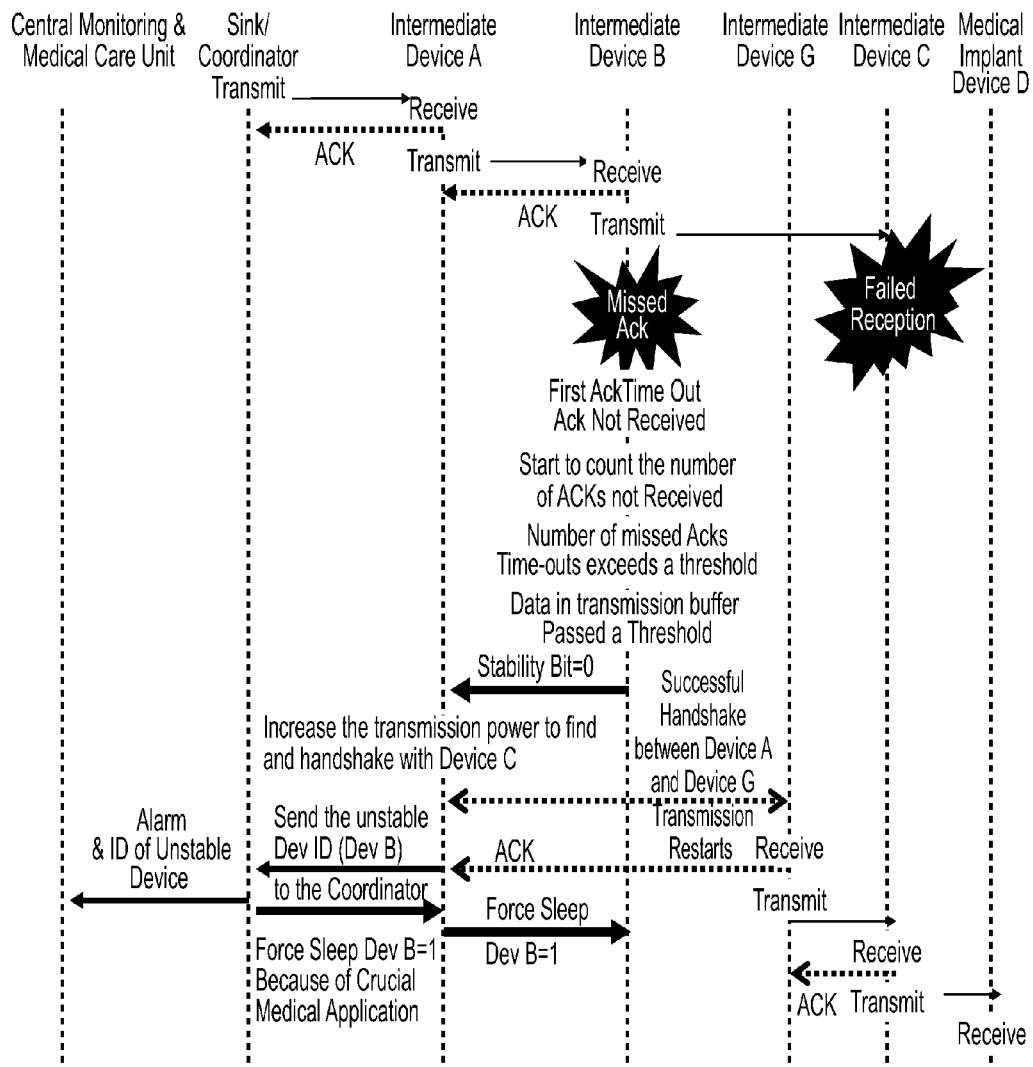

FIG. 12*a* is a schematic diagram showing communication between a medical device and a coordinator in a WSN with an unstable intermediate device;

FIG. 12*b* is a schematic diagram showing a first consequence of the unstable device in FIG. 12*a*;

FIG. 12*c* is a schematic diagram showing a second consequence of the unstable device in FIG. 12*a*;

FIG. 12*d* is a schematic diagram showing a final consequence of the unstable device in FIG. 12*a*;

FIG. 13 is a transmission diagram showing a scenario in which an intermediate device instability is resolved using invention embodiments;

FIG. 14 is a different depiction of the FIG. 13 transmissions;

FIG. 15*a* is a schematic diagram showing communication between an implant device and a coordinator via a wireless network;

FIG. 15*b* is the diagram of FIG. 15*a*, showing instability of an intermediate device B on the transmission route;

FIG. 15*c* is the diagram of FIG. 15*a*, in which the device A searches for a replacement device on the transmission route;

FIG. 15*d* is the diagram of FIG. 15*a*, with the new route now established;

FIG. 16 is a transmission diagram showing a scenario in which an intermediate device instability is resolved using invention embodiments with a directional antenna capacity;

FIG. 17 is a different depiction of the FIG. 16 transmissions;

FIG. 18 shows the required modifications to IEEE 802.15.4 frame control fields to include an stability bit and stop bit;

FIG. 19 shows the current IEEE 802.15.4 basic format of a MAC (command) frame;

FIG. 20 shows the current command frame identifiers of IEEE 802.15.4;

FIG. 21 shows a suitable MAC command frame including an indication of stability;

FIG. 21*b* shows another suitable MAC command frame including an indication of stability; and FIG. 22 shows a modified table of command frame identifiers.

Before explaining the embodiments of the present invention, some background explanation will be given of those parts of IEEE 802.15.4 which are expected to have relevance for the design of wireless networks (such as piconets, WPANs and BANs, including MBANs) having devices having a variable sleep pattern and/or could be used as a basis for the IEEE 802.15.6 standard currently under development.

Figure 1:
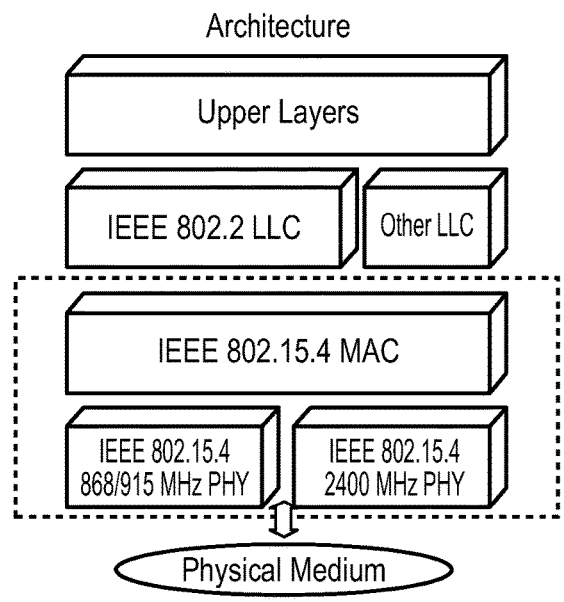
FIG. 1 illustrates protocol layers in an IEEE 802.15.4 WPAN.
Figure 2:
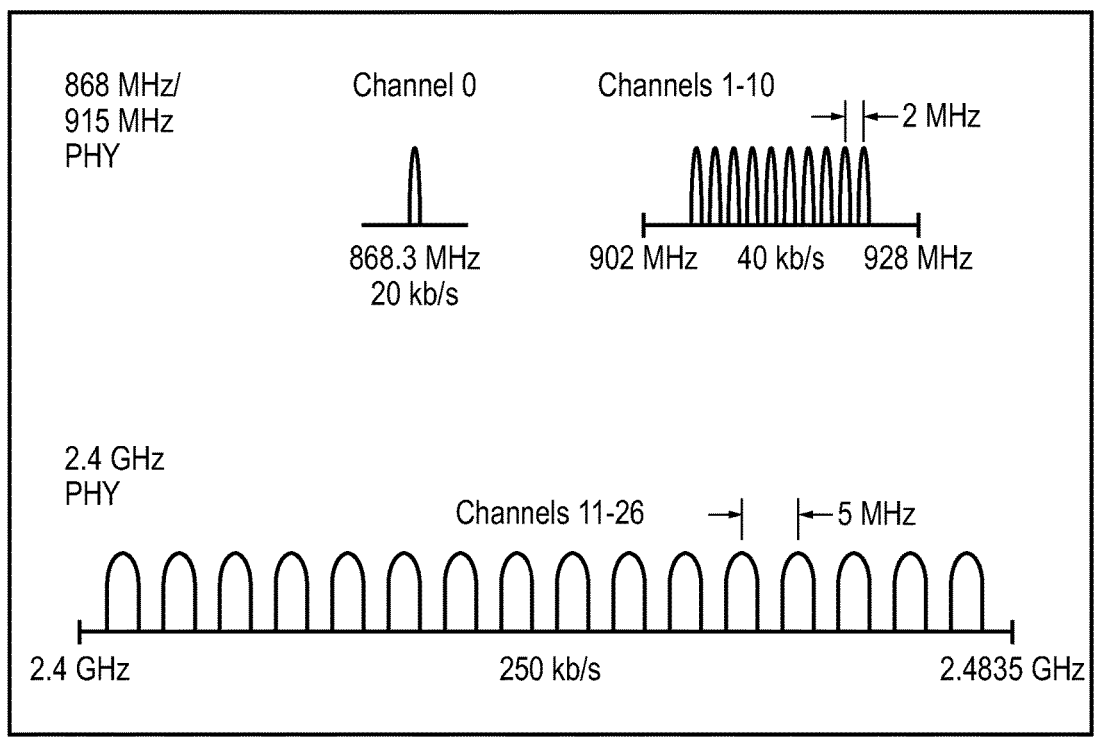
FIG. 2 illustrates possible PHY bands of the IEEE 802.15.4 WPAN.

FIG. 1 shows the general architecture of a IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
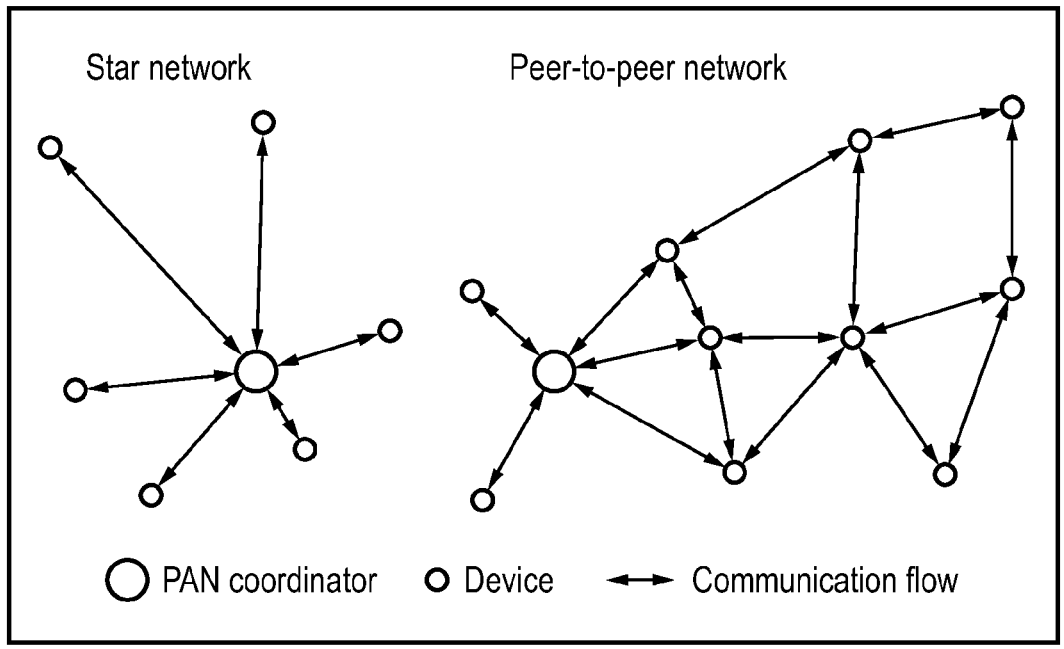
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central co-ordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. The topology may be dynamic, changing as devices are added or leave the network.

In the case of industrial WSNs, for example, a star network might be appropriate to monitor readings from sensor on a single stationary item of machinery with moving parts. A peer-to-peer topology, on the other hand, could be used to monitor objects on a conveyer belt.

In the case of MBANs, for example, a star network would be appropriate in the case where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network. Embodiments of the present invention relate to multi-hop networks in star or peer-to-peer formations.

Multiple star and/or peer-to-peer networks may be set up in the same location such as a hospital or factory, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs and other WPANs in which sensors may be implanted within a body or device and thus unable to have a large or rechargeable battery.

Two types of WPAN envisaged in IEEE 802.15.4 are beacon-enabled and non beacon-enabled.

Figure 4:
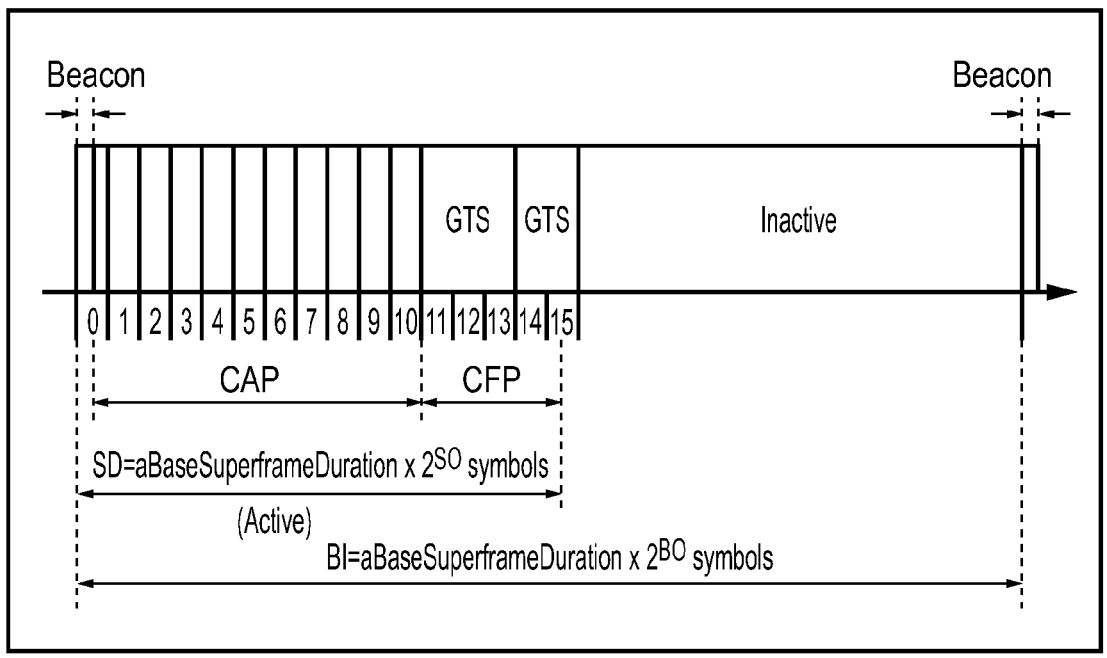
FIG. 4 shows the structure of a superframe in a beacon-enabled IEEE 802.15.4 WPAN.

In a beacon enabled network, the coordinator transmits a beacon periodically and devices listen periodically to that beacon to synchronize to the network and to access the channel. The channel access follows a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. First comes a slot 31 for a beacon frame (see below) transmitted by the coordinator. After this, several slots 32 are provided within the CAP, allowing data transmission to or from devices on a contended basis, following the known CSMA-CA algorithm. Briefly, in CSMA-CA, each time a device wishes to transmit within the CAP, it waits for a random period. If the channel is found to be idle, following the random backoff, the device transmits its data. If the channel is found to be busy following the random backoff, the device waits for another random period before trying to access the channel again.

Next there follow the guaranteed time slots GTS 33 of the CFP, and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern (or duty cycle) according to a certain protocol such as sensor—MAC.

For an MBAN application, the coordinator is external to the body or bodies being monitored. It may be a PDA, a mobile phone, a bedside monitor station or even a sufficiently-capable sensor which on a temporary basis acts as a coordinator. In an industrial WSN, the coordinator may be a PDA, a sensor, a laptop or other computer, or even a central or regional processor. As mentioned above, the coordinator in the beacon enabled network is in charge of providing synchronization and channel access to network devices. The start and end of a superframe is also defined by a coordinator. The coordinator has two main features of potential communications to other networks and access to a sufficient power supply, for example by easy replacement of the charged batteries.

FIGS. 5 to 8 illustrate data transfers between a device and a coordinator in a IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
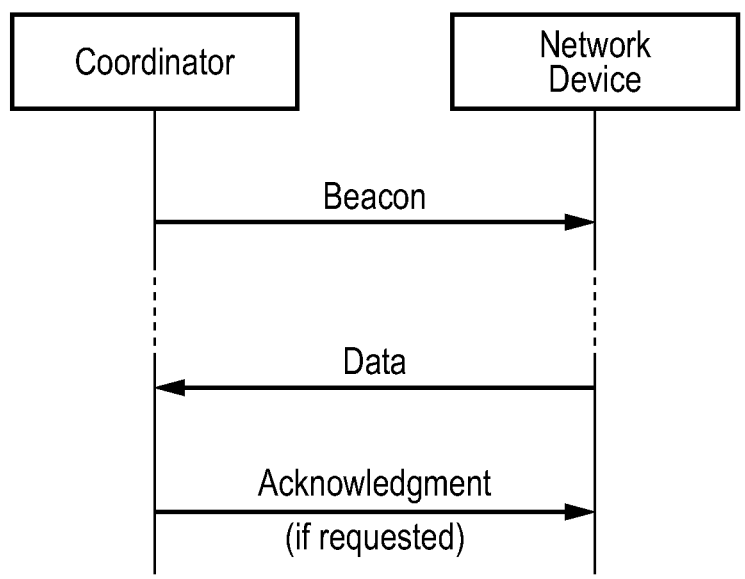
FIGS. 5 to 8 illustrate possible modes of data transfer between a network device and a co-ordinator in a IEEE 802.15.4 WPAN.
Figure 6:
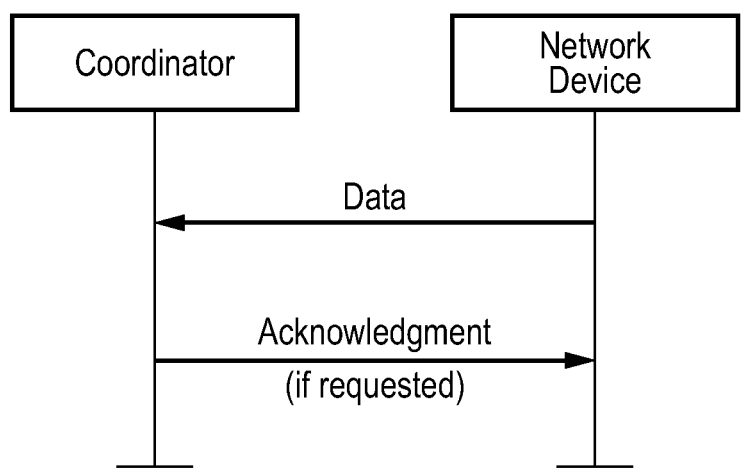

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator acknowledges the successful reception of the data by transmitting an optional acknowledgment frame 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
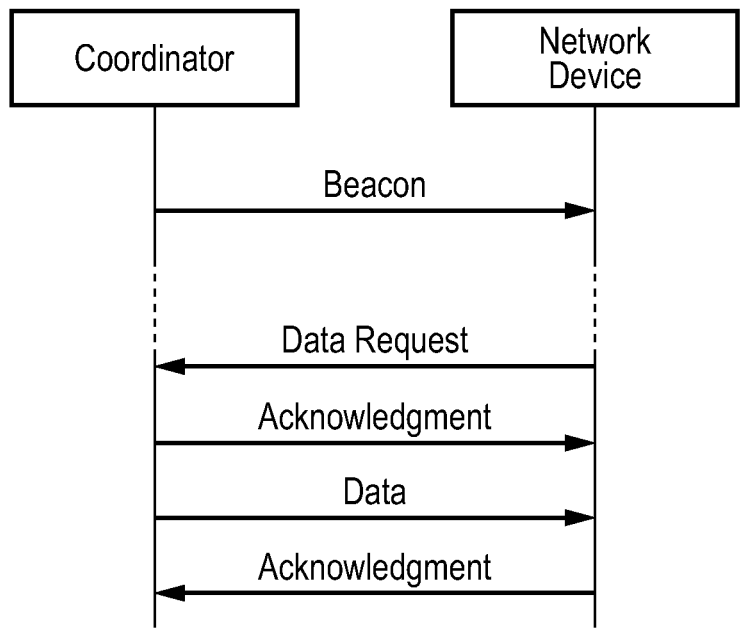
Figure 8:
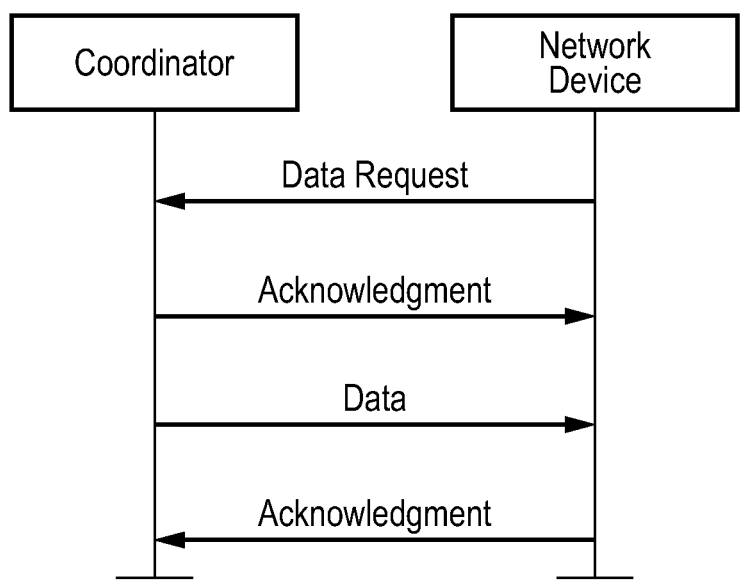

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an optional acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in a IEEE 802.15.4 network involve frames of four different types:
  beacon frame 41, used by a coordinator to transmit beacons
  data frame 42, used for all transfers of data
  acknowledgment frame 43, used for confirming successful frame reception
  MAC command frame 44, used for handling all MAC peer entity control transfers such as data requests.

Figures 9, 10, 11:
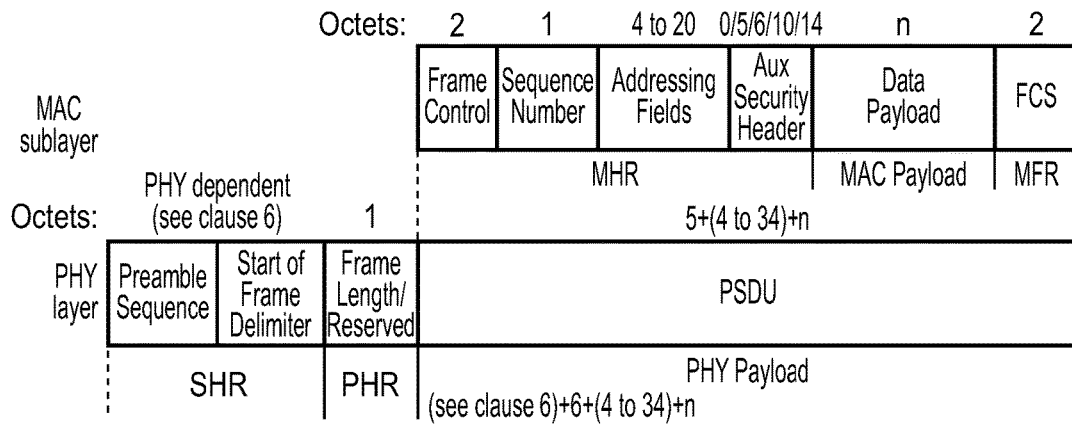
FIG. 9 shows a frame format used for a data frame in a IEEE 802.15.4 WPAN.
FIG. 10 shows the structure of a Frame Control field in the frame format of FIG. 9.
FIG. 11 is a table of possible values of frame type bits in the Frame Control field of FIG. 10.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 11. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 11 is a table of the possible bit values for the Frame Type subfield 51, showing that values 100 and 101 are unused in the IEEE 802.15.4 specification.

Having outlined the background of the present invention, reference is now made to the network situation giving rise to problems and to embodiments of the invention.

One of major requirements of IEEE 802.15.6 is the issue of reliable transmission of medical information and other critical information and stability of communications through the links or hops that carry medical information through a WSN or other wireless network. Any device on the transmission path such as unstable medical sensor or device acting as an intermediate device, may suffer from disconnection and out-of-reach problems. This may be caused by many factors such as low signal-to-noise ratios and being out-of-range in terms of transmission power. The devices that are subject to instability may connect and disconnect more frequently. For previous commercial applications considered in IEEE 802.15.3 and IEEE 802.15.4, the stability may not be as crucial as for medical standards such as IEEE 802.15.6 and for other critical data transmission. An unstable device that occasionally goes off-line may lead to collapse of life-saving medical processes or communications. It may seriously undermine the safety of patients.

Stability management has been considered based on the number of dropped connections or number of times the device disconnects and reconnects to the coordinator and WSN as a modification to the IEEE 802.15.3. The problem with this approach is that relying on number of lost connections may be reliable enough for a commercial application, but it is not suitable for a medical or other critical application. It is not sufficiently reliable since any drop of connection by a device may interrupt an ongoing medical application, endangering the lives of patients which rely on the crucial information being received from the coordinator.

Embodiments of the present invention take a different approach by considering some pre-emptive measures to protect the patients against an unstable device by preventing a link from being lost. In other words, rather than relying on the number of connections being lost which is not good enough for medical application (i.e. it can be seen as a "Too-Late" approach for a medical application), embodiments consider relay device connection parameters such as the number of missed Acks and the amount of data lost (or the congested data), as a measure of stability/instability to protect the patients against the lack of stability in a device acting as an intermediate relay node in a peer-to-peer network configuration, and carrying the life critical medical information. These parameters are available before a connection is dropped.

In this next section, we provide a detailed description of the problems facing a patient in a wireless sensor network when attempts are being made to communicate through an unstable intermediate device acting as a relay.

FIG. 12 is a schematic diagram showing a WSN 60 with a gateway or coordinator 61 and a sensor 62 linked via relays including unstable device 63. This unstable device can affect the whole medical process when there is an attempt by the coordinator, to reach the body implant sensor, through multiple hops. This problem thus relates to transmission from the coordinator to an inside-body implant or on-body medical sensor through a multi-hop transmission via an unstable device.

In FIG. 12a communications to an implant device are interrupted due to instability of device C. In FIG. 12b, device C has over a threshold number of acknowledgements timed out. That is, the expected acknowledgements from device D are not received, because data intended for device D has not been successfully transmitted. In FIG. 12c, crucial medical data will be lost at device C, because the data buffer is reaching capacity. Finally, in FIG. 12c there is a full failure of the connection between devices C and D and the life-saving medical application is interrupted.

In the next section, we describe the protocols according to invention embodiments which protect against unstable intermediate devices under a multi-hop transmission.

The first solution for the problem described above gives stability management in a medical WSN employing an omni-directional antenna FIG. 13 is a transmission diagram showing a scenario under which an intermediate relay device in the multi-hop transmission becomes unstable. An omni-directional antenna is deployed at the relay sensor. FIG. 14 is a more detailed view, which is labeled using the same scheme for easy identification. These and the following Figures show initial transmission of information in a downlink direction as an example, but initial transmission may also be uplink, in which case the direction of the commands and signaling is reversed.

To decide whether a device is unusable or not, two metrics are employed: 1. Number of missed Acks (for acknowledgements) 2. Amount of data accumulated in the transmission buffer waiting for transmission for device with long memory (For short memory devices, this will be replaced with the amount of packet data has already been dropped).

It can be seen how the coordinator may decide to put the unstable non-medical device into forced sleep to prevent it from endangering the medical device transmission due to future attempts of unstable device B to transmit or potential future unsuccessful attempts by other devices to relay through the unstable device B. The decision to put any unstable device in forced sleep would be performed by the coordinator considering the severity or emergency status of the ongoing medical process. Forced Sleep will be considered by coordinator only if there are other alternative routes available to reach the medical device or sensor.

The proposed protocol functions as follows. Firstly (S10, S11) information is transmitted normally on the downlink from the sink to device A and then on to device B. However, transmission further to device C is unsuccessful (S12) resulting in a missed acknowledgment when the procedure times out (S14). This missed acknowledgement triggers device B to check the accumulated number of missed acknowledgements (S15). If this has exceeded a threshold (S16), the device B then checks whether the data in the transmission buffer has also passed a threshold (S17); if so, device B sends (S18) an stability bit to device A, which is the relay start device referred to in the statement of invention. Device A then increases its transmission power to find a replacement link (S19) and locates device C, leapfrogging the old relayed link via device B and performing a successful handshake (S20). Transmission starts on the new A-C link (S21) and device A sends the faulty device ID to the coordinator in S22. The coordinator responds by deciding to force device B to permanent sleep, and transmitting this command via device A in steps S24 and S25, and by sending an alarm with device B's ID to a central monitoring unit in Step S23.

In a second embodiment, the solution for the problem uses a directional antenna. Here, to save power in the sensor it is suggested to employ a directional antenna rather than an omni-directional one. Otherwise, the assumptions are similar to the previous embodiment.

FIG. 15 show the chain of events on a pictorial basis useful in depicting antenna lobes. FIG. 15a shows normal operation of the WSN or other short range network. In FIG. 15b device B has become unstable. In FIG. 15c, device A tries different antenna positions to search for a replacement intermediate device. In FIG. 15d, a new path has been formed, via device G.

FIGS. 16 and 17 are corresponding transmission diagrams showing the same recovery scenario as before, but providing the new path with a change in direction, rather than jumping over the faulty device B. Thus further description of these diagrams is omitted. The only difference is that device A has directional antenna capability, and tries to discover a new relay node/device by changing the pattern of antenna and steering the antenna lobes diverting away from the unstable device to device G instated. The transmission path continues via device C, with the same number as hops as before the recovery.

The following description indicates how the above signalling protocols can be accommodated within a communication standard such as IEEE 802.15.6 which is currently under development based on IEEE 802.15.4. FIG. 18 illustrates a modification to the IEEE 802.15.4 frame format to include fields for indicating stability/instability of the intermediate device and for the stop bit. In some networks, the stop bit may be omitted and, for example, replaced with other network mechanisms for taking action as a result of any device instability.

In a first methodology, there are two new bits included in the frame for the control fields: 1. The stability bit: It will also be employed by sensor to indicate the sensor stability status by use of a zero value. 2. Force Sleep which will be employed to force the unstable device to inactive or sleep mode. Once it has received the value "1", the device will not come out of sleep until it receive a value "0". In a minor variation, the stop command which forces sleep may be transmitted in a frame control field using sleep bits. These bits can be used to set different sleep patterns of a device, hence one configuration of sleep bits may be "00" for full sleep mode.

An alternative means of conveying the signalling is using MAC commands. FIG. 19 shows the current IEEE 802.15.4 basic format of a MAC frame with the location of the MAC command octets and FIG. 20 shows the current command frame identifiers of IEEE 802.15.4.

For any embodiments of the invention, two fields may be used for "stability/instability" and "force sleep". However, the force sleep bit may be optional. A suitable MAC command frame including an indication of stability is shown in FIG. 21, which illustrates a suitable command frame identifier, as listed in a modified table of command frame identifiers in FIG. 22, which is sent in the MAC payload. FIG. 21 has no payload, so that the command frame identifier alone can be seen as an indication of stability (probably demonstrating instability in practical terms). In an alternative configuration shown in FIG. 21b, the payload may consist of one bit. A status/change of status in terms of stability or instability can be communicated using this payload bit (bit=0 Unstable; bit=1 Stable). Alternatively, more than one bit can be provided, giving a range of stability levels as previously mentioned and thus allowing the severity of instability to be communicated.

A similar command frame could be used for "force sleep", with no payload, or with a payload which could have one bit, or several bits, perhaps communicating a desired sleep time before the device may re-attempt to join the network in addition to the simple sleep command.

The above embodiments could be incorporated as an enhancement to IEEE 802.15.4 or as an integral part of a new standard under development requiring the proposed features such as IEEE 802.15.6, the standard for BAN.

There are several important features of invention embodiments, including:
1. Self determination of instability of a relay (intermediate) device when the number of NACKs and/or data waiting in the buffer exceeds a predefined threshold.
2. Signalling protocols for unstable device management in a peer-to-peer topology based on an Ack counter and transmission data buffer in the relay device. These include a new instability indicator bit and a new force sleep control bit.
3. A "Force Sleep" mechanism to force the unstable device to sleep in response to criticality of medical applications if there are other alternative routes available.

Invention embodiments include the provision of a self-instability confirmation mechanism within each device to evaluate the stability of the device by the device itself, allowing a pre-emptive method to reduce the probability of interruption to wireless communication link in a multi-hop BAN/WSN and reduction of the packet dropping rate, due to the instability conditions, by providing efficient and early pre-emptive alarm and response mechanisms to the unstable device.

The present invention may take the form of a novel sensor, coordinator, central monitoring unit, or hardware modules for the same, and can be implemented by replacing or modifying software executed by processors of the sensor(s) and/or the coordinator and/or central monitoring unit.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to IEEE 802.15.4 and IEEE 802.15.6 by way of example, the invention may be applied to any type of MBAN whether or not operating in accordance with IEEE 802.15.6, as well as to other types of BAN and other short-range WSNs which even if not medical body area networks nevertheless have a requirement for improved reliability of communication in emergency situations.

The invention claimed is:
1. A wireless network of devices, comprising:
a relay start device which is a medical sensor device;
one or more intermediate devices, which are non-medical devices acting as relays; and
a relay end device which is a coordinator acting as a gateway to the wireless network, information being communicated wirelessly in use between the medical sensor device and the coordinator via the one or more intermediate devices,
wherein the one or more intermediate devices each comprise control means and transmission means, the control means being operable to cause the transmission means of the intermediate device to transmit an indi- cation of connection stability as a function of at least one connection stability parameter of the intermediate device, indicating when the intermediate device is unstable; and the wireless network further comprises:
reconnection means operable to establish an alternative route avoiding an unstable intermediate device,
wherein the coordinator includes decision means operable on receipt of the indication of connection stability from the unstable intermediate device to take the indication into account to decide whether to transmit a stop or sleep command to the unstable intermediate device, causing the intermediate device to stop all transmission and reception,
wherein the reconnection means is operable after the indication of stability is transmitted and before the stop or sleep command is issued and
a decision of the coordinator to transmit the stop or sleep command to the intermediate device is performed according to a severity of an ongoing medical process and an availability of an alternative route.

2. A wireless network according to claim 1, wherein the indication of connection stability is one or more bits in a transmission frame, which when set to one or more predetermined values indicate a degree of stability of the intermediate device.

3. A wireless network according to claim 1, in which transmission of information is acknowledged and wherein one connection stability parameter is the accumulated number of missed acknowledgements of transmission expected, but not received by the intermediate device.

4. A wireless network according to claim 1, wherein the intermediate device further comprises a transmission buffer holding information waiting for transmission and one connection stability parameter is the amount of information waiting in the transmission buffer.

5. A wireless network according to claim 1, wherein one connection stability parameter is the number of data packets dropped by the intermediate device.

6. A wireless network according to claim 1, wherein the decision means takes other factors into account, preferably the availability of an alternative route avoiding the intermediate device and/or the emergency status of ongoing transmission.

7. A wireless network according to claim 1, further comprising reconnection means operable to establish an alternative route avoiding the intermediate device.

8. A wireless network according to claim 7, wherein the alternative route is established using a new transmission pattern diverting from the intermediate device.

9. A wireless network according to claim 7, wherein the reconnection means includes control means in the relay start device and control means in a further device replacing the intermediate device on the alternative route, which are together operable to set up a new connection.

10. A wireless network according to claim 7, wherein the relay start device is operable to transmit the intermediate device identification to a coordinator and the stop command is preferably transmitted from the coordinator to the relay start device.

11. A wireless network according to claim 7, further comprising alarm means operable to alert an outside entity to instability of the intermediate device in dependence upon the indication of connection stability.

12. An intermediate device for use in a wireless network of devices comprising a relay start device which is a medical sensor device, the intermediate device being among one or more intermediate devices which are non-medical devices acting as relays and a relay end device which is a coordinator acting as a gateway to the wireless network, information being communicated wirelessly in use between the medical sensor device and the coordinator via the one or more intermediate devices, the intermediate device comprising:
transmission means and reception means; and
control means operable to control the intermediate device;
wherein the control means is operable to cause the transmission means of the intermediate device to transmit an indication of connection stability to a device coordinator as a function of at least one connection stability parameter of the intermediate device, indicating when the intermediate device is unstable;
wherein the wireless network further comprises:
reconnection means operable to establish an alternative route avoiding an unstable intermediate device,
the reception means is operable to receive a stop or sleep command from the coordinator which includes decision means operable on receipt of the indication of connection stability from the unstable intermediate device and the control means is operable to cause the intermediate device to stop all transmission and reception on receipt of the stop or sleep command,
wherein the reconnection means is operable after the indication of stability is transmitted and before the stop or sleep command is issued, and
a decision of the coordinator to transmit a stop or sleep command to the intermediate device is performed according to a severity of an ongoing medical process and an availability of an alternative route.

13. A coordinator in a wireless network of devices comprising at least the coordinator, one or more intermediate devices which are non-medical devices acting as relays and a relay end device acting as a gateway to the wireless network, information being communicated wirelessly in use between the coordinator and the relay end device via the one or more intermediate devices, wherein the coordinator comprises:
reception means operable to receive an indication of connection stability of the intermediate device from the intermediate device;
wherein the wireless network further comprises:
reconnection means operable to establish an alternative route avoiding an unstable intermediate device,
the coordinator including decision means operable on receipt of the indication of connection stability from the unstable intermediate device to decide whether to transmit a stop command to the intermediate device, causing all transmission and reception to stop,
wherein the reconnection means is operable after the indication of stability is transmitted and before the stop command is issued, and
a decision of the coordinator to transmit a stop or sleep command to the intermediate device is performed according to a severity of the ongoing medial process and an availability of an alternative route.

* * * * *